United States Patent [19]

Zelnik

[11] 4,009,751

[45] Mar. 1, 1977

[54] METHOD OF AND APPARATUS FOR HIGH INTENSITY HEAT AND/OR MASS TRANSFER BETWEEN TWO OR MORE PHASES

[75] Inventor: Andrej Zelnik, Bratislava, Czechoslovakia

[73] Assignee: Slovenska vysoka skola technika, Bratislava, Czechoslovakia

[22] Filed: Nov. 7, 1974

[21] Appl. No.: 521,862

[30] Foreign Application Priority Data

Nov. 9, 1973 Czechoslovakia .................. 7681/73

[52] U.S. Cl. .................... 165/1; 165/156; 165/174; 165/179; 165/184
[51] Int. Cl.² .......................................... F28F 1/14
[58] Field of Search ............. 165/1, 156, 181, 179, 165/184, 174; 138/38

[56] References Cited

UNITED STATES PATENTS

| 1,349,571 | 8/1920 | Hubbard | 165/174 |
| 2,220,726 | 11/1940 | Newcum | 165/179 |
| 2,425,669 | 8/1947 | Brock | 165/156 |
| 2,578,550 | 12/1951 | Holm | 165/184 |

FOREIGN PATENTS OR APPLICATIONS

| 104,716 | 3/1917 | United Kingdom | 165/184 |

*Primary Examiner*—Wendell E. Burns
*Assistant Examiner*—Daniel J. O'Connor

[57] ABSTRACT

Heat and/or mass transmission between two or more phases is accomplished by a helical guide for both phases inside a column flowing either in counter-current or in co-current. The phase with a higher specific mass flows within the column along a continuous track formed by an outer helix; the phase with a lower specific mass flows along an internal helix within the column. These flows are brought about by suitable elements which are built-in in a cylindrical column.

2 Claims, 6 Drawing Figures

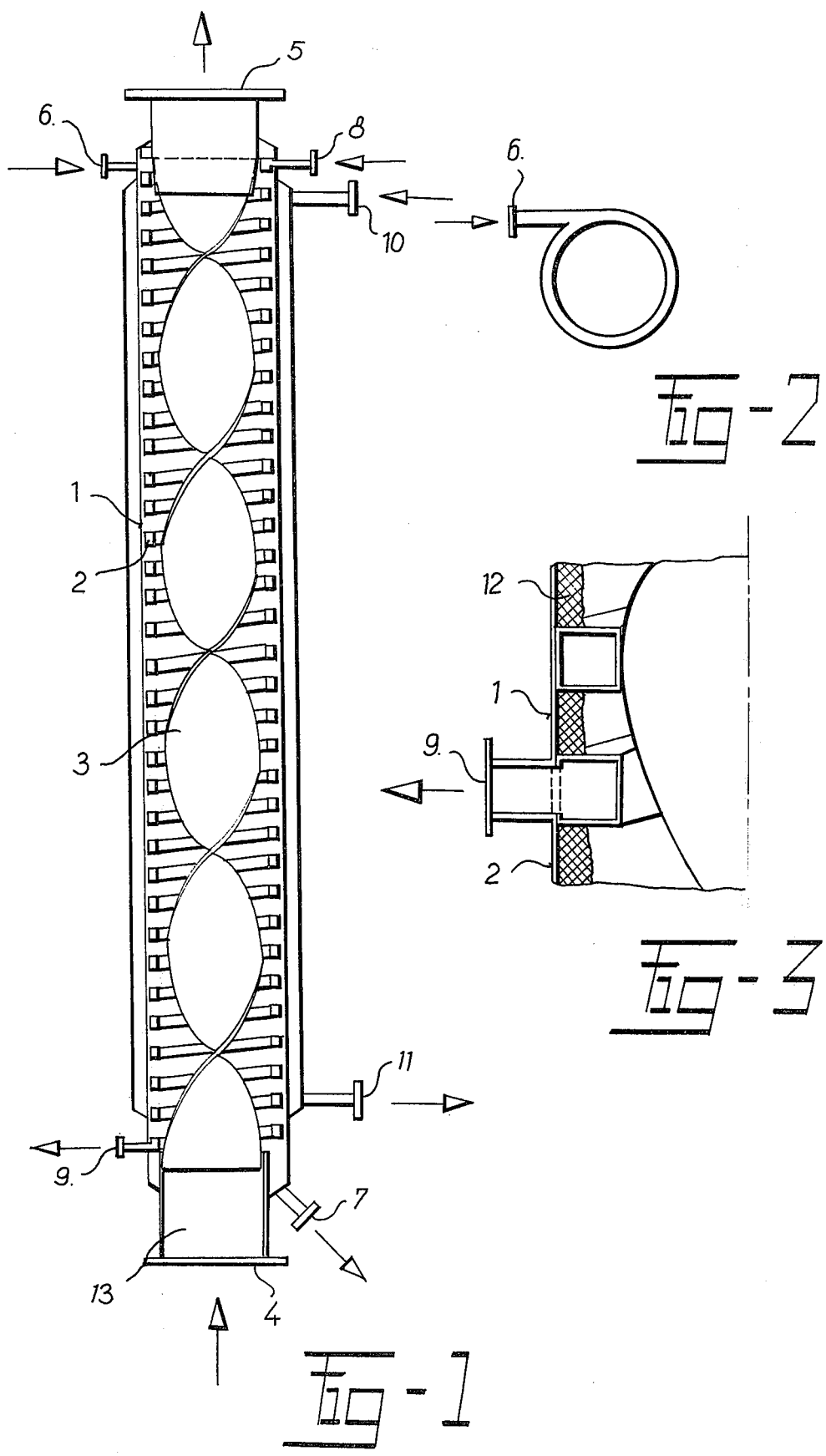

METHOD OF AND APPARATUS FOR HIGH INTENSITY HEAT AND/OR MASS TRANSFER BETWEEN TWO OR MORE PHASES

BACKGROUND OF THE INVENTION

The invention relates to a method of and an apparatus for high intensity heat and/or mass transfer between two or more phases, wherein the contacting phases are caused to form an intensive stream along a helical path in a space determined by suitable elements.

Arrangements for two phase contact are made for different materials frequently used in chemical technology and in related technical branches. In the process three phases often take part in the process simultaneously, as for instance absorption, desorption, rectification, drying, cooling or heating of granular or powder material, adsorption, chemosorption, catalytic processes in connection with supply or removal of heat and the like. Research and practice are endeavoring to find new ways of intensification of similar processes. In such research there is encountered the problem of limited driving power for the movement of the phase with the higher specific mass, the magnitude of which, of course, is determined by the intensity of the gravitational field of the earth.

This circumstance causes, in the case of a counter-current contact of the phases, which is characterized by a higher final concentration or temperatures respectively, and a larger driving force of the processes, and increasing entrainment of the phase with a higher specific mass, such loss being proportional to the increasing speed of the phase with the lower specific mass. When a critical speed is reached, the apparatus becomes flooded, or an inverse streaming is caused, whereby the functioning of the whole arrangement as a countercurrent arrangement is affected. A solution to this problem by the creation of an arrangement of the cocurrent - countercurrent type did not have the expected effect, and in its practical realization a number of difficulties particularly in design were met, not to mention a decrease of the driving force in the case of a contact of phases as above-arranged.

An apparatus is already known wherein the transfer of heat or mass between a gaseous or vapor phase on the one hand and of a liquid phase on the other hand is accomplished on the internal wall of a cylindrical surface, whereby the liquid phase enters tangentially into the upper part of the arrangement and forms a rotating film on the wall of the cylinder, with the gaseous or vapor phase moving in counter-current and similarly receiving a rotating movement. When comparing the achieved mass transfer coefficients with values published in technical papers (Chem. Eng. Progr. Vol. 45, 11, 677 — 1949 Koch a. o.); this arrangement showed an intensity calculated at eight to fifteen times higher with respect to a unit of the dry surface of the packing as used according to this paper. But despite that, the above-mentioned arrangement has the drawback in that when using arrangements of larger height, the liquid phase at an inlet speed of any available height forms only about one and one-half turns and subsequently flows down due to gravitational forces practically vertically without forming a spiral track. The speed of the phase with the lower specific mass remains practically at several meters per second. It is therefore obvious that the negative influence of the reduction of the centrifugal acceleration with respect to the gravitational acceleration has prevailed, thereby determining the character of flow of the liquid phase in the middle part of the column. It has been found that a complicated rear flow takes place which compensates the concentration and thus reduces the driving forces of the process.

SUMMARY OF THE INVENTION

It is an object of this invention to remove to a great extent the drawbacks of known arrangements of this kind by causing the contacting phases to form an intensive counter-current, or rotational movement, whereby in case of a counter-current of the phases, the phase with a higher specific mass flows through a suitably arranged space formed by a helical insert on the internal surface of a column, with turns in the opposite direction to the direction of rotation of the phase with the lower specific mass, flowing within the internal space of the column and brought to a rotational movement by another helical insert or flowing through an annular space; for this purpose a central tube is provided with rosettes causing the phase with the lower specific mass to perform an intensive rotational movement.

In case of a co-current contact, the turns of the insert at the internal surface of the column are coincident with the direction of rotation of the phase with the lower specific mass.

The apparatus of the invention comprises a column with a stable helical insert on its internal surface so that it forms a continuous channel for the phase with the higher specific mass. Furthermore, the apparatus has another helical insert for causing the phase with the lower specific mass to flow along a helical track within the internal space of the column. There is furthermore an inlet and an outlet neck for the phase with the lower specific mass, and an inlet and an outlet neck for the phase with the higher specific mass. There may also be an inlet and an outlet neck for a cooling or heating medium, if the helical insert is hollow and serves as a heat transmitting surface; in addition, a duplicator with an inlet and an outlet neck for a heat transmitting medium can be used.

The arrangement can be provided with a central tube forming an annular space for the flow of the phase with the lower specific mass, with a suitably arranged tangential inlet with hollow blades for the supply of the phase with the lower specific mass, and with a suitable outlet for this phase in the upper part of the arrangement. The phase with the lower specific mass can also be introduced axially by means of a distributor provided with rosette blades.

Two or more similar arrangements can be connected in series or in parallel.

The method and apparatus according to this invention solves the problem of intensification of transfer processes of contacting phases at their relatively high speeds in spaces formed by two helical inserts within a column or in an annular channel, so that the phase of higher specific mass utilizes the shearing stress on the boundary of the phases, with a suitably arranged insert on the internal surface of the arrangement, whereby in case of a counter-current contact of phases the limiting factor for the movement of the phase is no longer the value of the intensity of the gravitational field of the earth. The method and apparatus can also be applied with success in the case of a co-current contact of phases.

An embodiment of the apparatus with an annular space and a helical guide for the phases, with a column having a diameter of 300 mm and a height of 2,000 mm brought remarkable results. The proof thereof is not only the high values of the coefficient for transfer of the mass, which achieved, in case of a mass passage of the gaseous phase of 2,400 kg/h and a ratio of L/G from 0.1 to 0.9 the maximum value of $$K_y = 68 \text{ kmol/n}^2\text{h kmol/kmol},$$

which substantially exceeds the values of the coefficient of mass transmission by classical arrangements, but also a low value of pressure losses and a low value of the space required by the apparatus. If substantially dusty gases are employed, the arrangement offers a self-cleaning property; this is also one of its more significant advantages. The substantial effect of intensification of the transfer properties with arrangements with a channel of either an annular cross-section or formed by two helical inserts can be, for instance, proved by comparison of achieved values of the product of the coefficient of mass transfer and of the specific surface. This important coefficient achieved values from 1,000 to 15,000. If we compare these values with values achieved with classical arrangements, we see that there is a many-fold increase of the effect.

In the attached drawings showing some exemplary embodiments of the object of this invention:

FIG. 1 is a cross-sectional elevation of a first embodiment in accordance with the invention;

FIG. 2 is a sectional view of an inlet neck for the phase with the higher specific mass;

FIG. 3 is a sectional view of an outlet neck for the heat transfer medium if a hollow insert is used;

DESCRIPTION OF PREFERRED EMBODIMENTS

Figure 4:
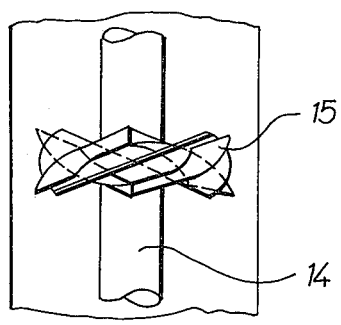
FIG. 4 is an elevation of an alternative arrangement employing an insert serving to promote the rotation of the phase with the lower specific mass.

The embodiment of the apparatus according to FIGS. 1, 2 and 3 comprises a column 1 provided with a stable helical insert 2 on the internal wall of the column 1 so that it forms a continuous channel for the flow of the phase 12 with the higher specific mass. The column 1 furthermore has an internal helical insert 3 for the promotion of the rotational movement of the phase 13 with the lower specific mass. The apparatus also has an inlet neck 4 and an outlet neck 5 for the phase 13 with the lower specific mass and an inlet neck 6 with an outlet neck 7 for the phase 12 with the higher specific mass. The apparatus can also have an inlet neck 8 and an outlet neck 9 for cooling or heating medium if the hollow helical insert 2 is used as a heat transmitting surface. The arrangement can also be provided with a duplicator with an inlet neck 10 and an outlet neck 11 for the heat transmitting medium.

Figure 5:
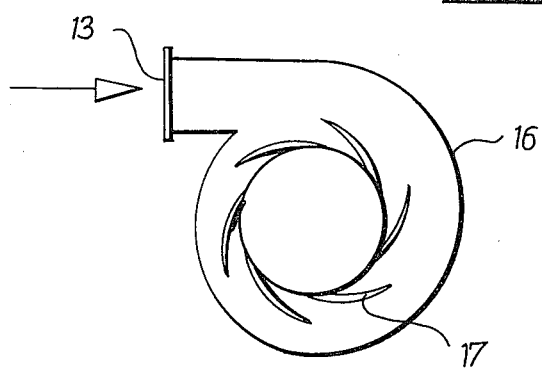
FIG. 5 is a schematic view of the inlet of the phase with the lower specific mass.
Figure 6:
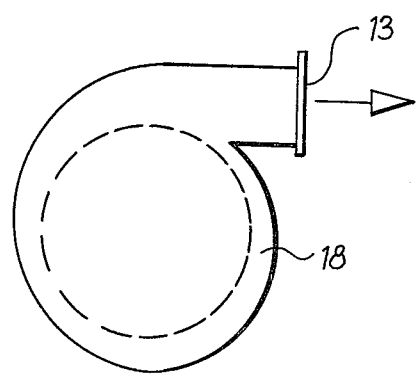
FIG. 6 is a similar view of the outlet thereof.

FIG. 4 shows an alternative arrangement of the insert in the column 1 consisting of a central tube 14 which together with the column 1 forms an annular space for the flow of phase 13 with the lower specific mass; this central tube 14 is provided with blade rosettes 15 or with a helical surface. In this case the arrangement has tangential inlet means 16 (see FIG. 5) with hollow blades 17 for promoting an intensive rotation of phase 13 with the lower specific mass, and has suitable outlet means 18 for this phase 13 in the upper part of the arrangement. The inlet and outlet means for phase 13 with the lower specific mass can also be arranged axially.

The arrangement according to this invention operates as follows:

The phase with the higher specific mass is supplied via an inlet neck in the upper part of the arrangement into the space formed by the stable helical insert in the internal surface of the column. The first two or three turns of the insert are enclosed by a cover to prevent a direct dissipation of the phase with the higher specific mass into the stream of the phase with the lower specific mass. The phase with the lower specific mass is supplied via an inlet neck in the lower part of the arrangement; it flows through the central space of the column formed between the internal surface of the column and the helical insert, and leaves the arrangement via the outlet neck in the upper part thereof. Due to centrifugal acceleration, the phase with the larger specific mass is forced into the space between the turns of the external stable helical insert and is accelerated in the course of its downward flow with respect to the phase with the lower specific mass, proceeding in counter-current to it. The phase with the higher specific mass leaves the arrangement via the outlet neck in the lower part of the arrangement. The phase with the lower specific mass is caused to rotate by the internal helical insert.

The arrangement using a central tube for forming an annular space operates substantially similarly to the above-described one, with the difference that the phase with the lower specific mass flows in a spiral course in the annular space formed by the central tube and the column, the central tube being provided with blade rosettes or with a helical surface respectively, which promote a rotational movement of this phase.

The arrangement according to this invention can be applied for different operations and also for solutions of important problems of retaining exhalations. In case of working with substantially dusty media, the arrangement has a self-cleaning effect, which is also one of its more significant advantages.

Although the invention is illustrated and described with reference to a plurality of preferred embodiments thereof, it is to be expressly understood that it is in no way limited to the disclosure of such a plurality of embodiments, but is capable of numerous modifications within the scope of the appended claims.

What is claimed is:

1. In a method of heat and/or mass transfer between first and second fluid phases wherein the first phase has a specific gravity greater than the second phase and wherein the method comprises the steps of separately flowing the first and second phases along an elongated cylindrical column in heat and/or mass transfer relation, the improvement which comprises the steps of directing the flow of the first phase downwardly through the column along an essentially continuous helical path throughout the entire length of the column adjacent the inner wall thereof, and directing the flow of the second phase along an essentially continuous helical path through the interior of the column in direct physical contact with the helical downward flow of the first phase.

2. Method as in claim 1, wherein the phases flow in co-current, and the turns of the helix for both phases are in the same direction.

* * * * *